ence Mar. 8, 1966

3,239,408
WOOD ADHESIVE AND COMPOSITE PRODUCTS
OBTAINED THEREFROM
Fred J. Meyer and Ralph M. Gooch, Midland, Mich., assignors to The Dow Chemical Company, Midland, Mich., a corporation of Delaware
No Drawing. Filed Sept. 22, 1961, Ser. No. 139,832
14 Claims. (Cl. 161—250)

This invention relates to the provision of useful adhesive compositions. More particularly, it relates to such compositions which are characterized in having exceptional strength and high binding capacity and which may be employed to particular advantage for joining, binding or laminating wood in various forms including sheets, boards and the like and chips, fibers or other particles or forms thereof as well as similar fibrous materials.

Accordingly, an improved adhesive composition especially well suited for utilization with wood and the like is comprised of a substantially homogeneous mixture of (1) aqueous latexes of interpolymers composed essentially of at least 2 weight percent of a monoethylenically unsaturated carboxylic acid, (2) at least one formaldehyde-yielding compound and (3) optionally, certain finely divided water-dispersible filler materials as will be described.

The desirable benefits of the adhesive compositions are attained by combining the formaldehyde-yielding post additive, a polymeric material which contains free carboxyl groups and filler materials, if desired. The interpolymer must contain at least 2 percent of the monoethylenically unsaturated carboxylic acid in polymerized form if the benefits of the composition are to be realized. Representative of such acids are the monocarboxylic acids such as acrylic and methacrylic acids; the dicarboxylic acids such as maleic, fumaric and itaconic acids; and the polycarboxylic acids such as cis- and transaconitic acids. Other suitable polymerizable carboxylic acids will be known. The remainder of the interpolymeric composition may comprise about any combination of monomeric materials which are copolymerizable with the ethylenically unsaturated acid. As illustrative of monoalkenyl aromatic monomers of the benzene series that can be used are styrene, vinyl toluene, alpha-methylstyrene, ortho-methylstyrene, meta-methylstyrene, para-methylstyrene, ar-ethylstyrene, ar-chlorostyrene and others known to polymerize with the acidic monomer and the aliphatic conjugated dienes having from 4 to about 9 carbon atoms including typically 1,3-butadiene, 2-methyl-1,3-butadiene, 1,3-pentadiene, 2,3 - dimethyl - butadiene-1,3, 2-ethyl-butadiene-1,3 and the like. The above is but a representative list of those polymerizable materials which will be known and available to the skilled worker.

It is possible to use only one of the monomers in conjunction with the acid, but equally advantageous and beneficial results are attained from the use of two or more such as styrene and butadiene, with the polymerizable acid. Of special advantage there may be recited those interpolymeric materials disclosed and claimed in the copending application U.S. Serial No. 657,766, filed May 8, 1957, by John F. Vitkuske. In that application, there was disclosed the emulsion polymerizates of monomeric materials consisting of from 2 to 10 percent by weight of at least one monoethylenically unsaturated acid including typically the monocarboxylic and dicarboxylic acids; from 30 to 50 percent by weight of an aliphatic conjugated diene including butadiene; and from 48 to 68 percent by weight of a third monomer consisting essentially of from 10 to 100 percent by weight of a monoalkenyl aromatic monomer. The carboxylic function of the interpolymer may derive from two or more polymerized carboxylic acids. Other interpolymeric compositions will be immediately apparent to those skilled in the art to afford judicious selection of monomeric compositions.

It is unnecessary that the latex of the interpolymer be film forming per se and it is preferred that the latex not be capable of film formation by simple deposition and drying.

The post additive compounds that are highly effective in the promotion of suitable cross-linking and subsequent curing reactions of the high molecular weight interpolymeric wood-adhering compositions of the present invention are organic and metallo-organic complex compounds which provide or release formaldehyde at temperatures in excess of about 150° C. Examples of suitable formaldehyde donors are formaldehyde per se, paraformaldehyde, trioxane, the methylol derivative of triphenyl methane, zinc, and sodium formaldehyde sulfoxylate, zinc and sodium formaldehyde hydrosulfite, sodium formaldehyde bisulfite and the like and particularly hexamethylenetetramine. Generally, the addition of from about 2.5 percent to about 25 percent by weight of one of these formaldehyde donors to the above latexes results in improved wood adhesive compositions.

In adhesive applications not appreciably affected by the viscosity of the binding composition employed, the instant latex adhesive compositions are highly satisfactory without filler additaments. However, the fillers that may be employed in this invention include water-soluble or water-dispersible proteinaceous and carbohydrate materials or mixtures and blends thereof. These are fillers which contain sites which are reactive with carboxylic acids to form amide and ester-type linkages respectively or which chemically combine in other fashion with the carboxylic function. A considerable advantage, particularly in resistance to moisture, is gained with the use of the proteinaceous materials. Exceptional results are attained when the filler is a finely divided soybean protein flour. Accordingly, this material is a preferred species. Other proteinaceous materials finding utility, however, include sodium caseinate, soluble blood, wheat flour, soybean-blood blends, soybean-α-protein, walnut shell flour and other known protein products. Exemplary of the carbohydrates are corn starch, black strap molasses, dextran and cationic starch. Other useful fillers falling within the aforementioned scope will be apparent to the skilled worker.

The compatibility of the post additive, formaldehyde-yielding compounds with the interpolymer latex compositions containing a wide variation in the amounts of filler materials, makes possible the inclusion of both additives if and when advantageous to the quality of the bonded wooden article to be produced.

It is essential that the adhesive composition be in a form whereby it may be readily applied to the wood or other materials by conventional techniques. Conveniently this may be achieved when the polymeric component is dispersed in a liquid medium. Polymer latexes are a readily-made dispersion of a polymer in extremely finely divided form so that homogeneous admixture with a formaldehyde-yielding compound and/or filler is readily achieved. For this reason, the aqueous latexes of the previously-defined interpolymers are preferred for making up the adhesive compositions. The filler materials should be finely divided for the most efficacious mixing of the filler into the adhesive composition. The fillers may be dispersed in or throughout the continuous phase of the polymer dispersion. It is only necessary that a substantially homogeneous admixture of additaments and interpolymer be present for subsequent reaction.

The solids content of any such dispersion will vary according to the individual preference, the equipment available and the adhesive applying technique desired. When spray methods are used to make particle board, it may be desirable to use very thin dispersions of low solids content. When doctoring the composition onto plywood veneers or the like, it may be desirable to employ paste-like masses of from about 20 to about 60 or more percent by weight of solids. The compositions may be employed in any proportion of solids commonly used with the conventional adhesive-applying techniques without reduction in the beneficial results.

The finely divided filler, when incorporated, may be employed in a wide range of proportions to suit equipment or process capabilities or limitations and to tailor the formulation to the equipment, process or use. Thus, desirable benefits of adhesiveness may be attained when there is used as little as about 50 percent of filler, based on the weight of latex solids. At the other extremity, it has been found that the indicated utility is retained when the formulation contains 200 or more percent of filler based on the weight of latex solids. As a general rule, it may be stated that as the proportion of filler is increased with a given latex solids, there results a decrease in water resistance to the cured or set adhesive composition. However, it also follows that this water resistance is dependent to a significant extent on the cure temperature employed. As the proportion of filler is increased, it is necessary to employ a higher cure temperature to reach a given water resistance. The optimum water resistance and other properties will thus be capable of variation within wide limits.

Wood and the like composite products that may be glued, joined or laminated with the advantageous adhesive compositions of the invention (such as laminate plywood from sheets and veneers; panels, particle boards and like from chips and other filler particles; paper-like products from short hardwood fibers or various natural and synthetic fibers or any desired mixtures of such fibrous materials, etc.) have suitable initial strength as composite structures, excellent cold soak wet strength and exceedingly good retention of their strength even after being subjected to boiling water for considerable periods. Conventional amounts of the adhesive composition of the invention may be utilized for joining or binding wood and the like in any particular application. In fact, it is one of the benefits of the instant invention that frequently less adhesive is necessary for binding the wood than with the prior known adhesives. Composite structures of wood products that have been prepared with the adhesive compositions of the invention are at least commensurate, if not superior, in these regards to many of the usual adhesive materials, such as urea-formaldehyde compositions, that have heretofore been available and frequently employed for such purposes.

In preparing composite wood or other structures with the adhesive compositions of the invention, the permanent desired joinder is effected under the influence of heat at an elevated curing temperature for the mixture of the post additive compound and interpolymer for a sufficient period of time to permit it to be thoroughly cured in situ while in binding contact with the wood or article being joined or bonded. Advantageously, the adhesive composition is joined and set to bind the composite structure under a compressive effect of an applied pressure on the wooden or equivalent structures or particles being joined during the curing of the adhesive composition.

The pressure that is utilized need only be sufficient to ensure an intimate contact between the bonding surfaces. Relatively high pressures, such as may be developed by, under, or with the assistance of platens, rams, and other pressing apparatus may also be employed. Thus, the pressure that is effected to compact the material being joined during setting of the adhesive composition may be between about 15 or less and 200 or more pounds per square inch, depending upon whatever conditions may be best suited and the practice that may be most desirable or favored when manufacturing various composite articles and structures.

It is usually necessary to employ a temperature from a heat-exchanging means of at least about 200° F. in order to cure the adhesive composition. While some of these temperatures are somewhat above the temperatures at which cellulose is usually considered to commence carmelization, the conditions under which the adhesive composition is usually employed as a binding component for wood generally results, at worst, in one or more mere changes in the appearance of the wood, without serious degradation or depreciation of its essential structural properties and characteristics. Frequently, not even this sort of change is incurred.

The period of time that the curing heat is applied depends to a great extent, as will be appreciated by those skilled in the art, upon the configuration and particular constitution of the structure being joined or bound as well as upon the heating conditions that are utilized and the heat transferring or exchanging efficiencies that may be involved. In many instances, as will hereinafter be apparent, the use of curing times that are longer than the absolute minimum which may be necessary for good bonding may achieve a significant increase in the water resistance of the bond. Care should be taken in all instances to avoid such extremes of temperature alone or time and temperature combined that may cause either the wood product or the adhesive composition to degrade, decompose, burn or char so as to change its essential physical properties.

In the following examples, which are given only for purposes of illustration, all parts and percentages are by weight.

*Example I*

A latex was prepared by emulsion polymerizing 74.1 parts of styrene, 19.3 parts of butadiene, 4.4 parts of fumaric acid and 2.2 parts of acrylic acid to give a latex containing about 35.5 percent by weight solids. The latex was divided into two approximately equal portions. (Latexes I and II.) To Latex II was admixed about 20 parts by weight of hexamethylene tetramine. Thereafter, various compositions were prepared containing that formulated Latex II and from about 0.5 to about 2 parts by weight of soybean flour for each part by weight of the latex. In like manner, Latex I was admixed with the same amounts of soybean flour to prepare a set of control compositions for the purpose of comparing dry strength, cold soak and cyclic boil properties.

Three-ply yellow birch panels were prepared from 1/16-inch rotary cut veneer in a size of 7½ inches by 12 inches. The compositions were brushed onto the veneer and pressed for five minutes at a pressure of about 200 pounds per square inch. The press temperatures used were room temperature, 200°, 250° and 300° F. The panels were cut into standard plywood strip-shear specimens for testing, according to Commercial Standard CS 35–56 Section 5.4.1, "Dry Shear Test" Section 5.5, "Cold Soak Test" and Section 5.4.2, "Cyclic Boil Test." The results are recorded in Table I.

TABLE I.—SHEAR STRENGTHS OF 3-PLY YELLOW BIRCH PANELS USING A 10-POUND PER SINGLE GLUE LINE SPREAD AND A 3-MINUTE PRESS CYCLE

| Latex/Soy Flour Ratio | Press Temp., °F. | Dry Strength | | 48-Hour Cold Soak | | 4-Hour Cyclic Boil | |
|---|---|---|---|---|---|---|---|
| | | Latex I[a], p.s.i. | Latex II[b], p.s.i. | Latex I[a], p.s.i. | Latex II[b], p.s.i. | Latex I[a], p.s.i. | Latex II[b], p.s.i. |
| 1 to 0.5 | 200 | 350 | 563 | 150 | 297 | D | 290 |
| 1 to 1 | 200 | 381 | 462 | 130 | 253 | D | 128 |
| 1 to 2 | 200 | 390 | 460 | D | 233 | D | 70 |
| 1 to 0.5 | 275 | 542 | 625 | 276 | 335 | 231 | 272 |
| 1 to 1 | 275 | 562 | 600 | 247 | 332 | 198 | 250 |

[a] Latex I = Latex/soybean flour adhesive composition.
[b] Latex II = Hexamethylene tetramine/latex/soybean flour adhesive composition.

*Example II*

A quaternary interpolymer latex was prepared by emulsion polymerizing 74.1 parts of styrene, 19.3 parts of butadiene, 4.4 parts of fumaric acid and 2.2 parts of acrylic acid to form a latex dispersion in water containing about 35.5 weight percent solids.

Four adhesive compositions were prepared employing the above described aqueous latex dispersion. Adhesive A: About one part of latex solids was admixed with about four parts of soybean flour. Adhesive B: About one part of latex solids was admixed with about one part of soybean flour. Adhesive C: The aqueous quaternary interpolymer latex dispersion having about a 35.5 weight percent latex solids content was employed per se. Adhesive D: The aqueous quaternary interpolymer latex dispersion having about a 35.5 weight percent latex solids content was combined with about 5.0 weight percent of hexamethylene tetramine based on the weight of latex solids.

Subsequently, about 1026 gram samples of pine wood flakes were placed in a small size rotatable cement mixer provided with a screen member for covering the mixer opening. While the pine flakes were tumbled in the mixer, about 31 grams of water were added by means of a spray technique to provide the proper moisture content for the wood flakes. Thereafter, about 111 grams of Adhesive A, as described above, having a latex solids content of about 5.0 weight percent, were evenly sprayed over the tumbling pine flakes in a manner suitable to provide maximum adhesive coating of the flakes.

Two particle board mats were shaped of the Adhesive A/pine flake mixture each containing approximately 491 grams of wood flakes. The mats were heat cured for a period of about 12 minutes in a 50-ton electrically operated "Hydrolair" molding press with the platen temperature maintained at about 340° F. and a pressure of about 615 pounds per square inch.

Sheets of laminated particle board were produced having the overall linear dimensions of about 10 inches by about 13 inches by about 3/8 inch in thickness. To control the density of the finished adhesive-bonded particle board sheets, two stop bars were positioned near the edges of the two shorter sides (or the 10-inch sides) of the molding press during the curing operation. The stop bars were made of ten-inch lengths of 3/8 inch by 3/8 inch square key stock stainless steel.

After the laminated particle boards were formed, regulation test specimens were cut by means of a jig saw for testing according to standard procedures described in A.S.T.M. Designation: D 1037–60T, Part A, entitled, "Tentative Methods of Test for Evaluating the Properties of Wood-Base Fiber and Particle Panel Materials."

Employing the procedures described above particle boards containing 5.0 weight percent adhesive solids of each of the three remaining types of adhesives (Adhesives B, C and D) were prepared and tested for physical properties. Average numerical results obtained from the standard tests are shown for all four types of particle board in Table II which follows.

TABLE II.—EFFECT OF ADDITION OF HEXAMETHYLENE TETRAMINE ON LATEX I[a] USED AS A PARTICLE BOARD ADHESIVE

| | Adhesives | | | |
|---|---|---|---|---|
| | A | B | C | D |
| Density, Lbs./ft.³ | 39.0 | 41.7 | 40.9 | 41.6 |
| Internal Bond, p.s.i. | 56 | 97 | 79 | 131 |
| Modulus of Rupture, p.s.i. | 2,850 | 4,590 | 3,690 | 4,431 |
| Modulus of Elasticity, p.s.i. | 380,000 | 512,000 | 500,000 | 474,000 |
| 24-Hour soak in cold water: | | | | |
| Percent H₂O Absorption | 94 | 71 | 73 | 66 |
| Percent Thickness swell | 39 | 26 | 26 | 24 |
| 4-Hour boil +20 hrs. drying at 60° C.: | | | | |
| Percent Thickness swell | 41 | 28 | 57 | 29 |

[a] See footnote [a], Table I.

What is claimed is:

1. An adhesive composition particularly for wood and wood products comprising a homogeneous mixture of from about 20 to about 60 weight percent solids composed of (1) an aqueous latex of an interpolymer composed essentially of an aliphatic conjugated diene, containing from 4 to 9 carbon atoms, a monoalkenyl aromatic monomer of the benzene series, and at least 2 percent of its compositional weight of at least one monoethylenically unsaturated acid interpolymerized therein and (2) at least one formaldehyde-yielding post additive compound.

2. The composition of claim 1, wherein said aqueous latex is an interpolymer composed of from about 2 to about 10 weight percent of at least one monoethylenically unsaturated acid, from about 30 to about 50 weight percent of said aliphatic conjugated diene, and from about 48 to about 68 weight percent of a third monomer consisting essentially of from about 10 to about 100 weight percent of a monoalkenyl aromatic monomer of the benzene series interpolymerized therein.

3. The composition of claim 1, wherein said formaldehyde-yielding, post-additive compound is combined with said aqueous latex in an amount of from about 2.5 to about 25 weight percent based on the polymeric solids content of said aqueous latex.

4. The composition of claim 3, wherein said formaldehyde-yielding, post-additive compound is hexamethylene tetramine.

5. The composition of claim 1 having also dispersed therein at least one finely-divided, water-dispersible soybean flour filler containing substituents reactive with carboxylic acids in an amount of from about 50 to about 200 weight percent based on the solids content of said aqueous latex.

6. An adhesive composition particularly for wood and wood products comprising a homogeneous mixture of from about 20 to about 60 weight percent solids composed of: (1) an aqueous latex of an interpolymer composed of 2.2 percent by weight of acrylic acid, 4.4 percent by weight of fumaric acid, 19.3 percent by weight of butadiene and 74.1 percent by weight styrene interpolymerized therein and (2) about 5 percent by weight of hexamethylene tetramine based on the solids content of said aqueous latex.

7. An adhesive composition particularly for wood and wood products comprising a homogeneous mixture of from about 20 to about 60 weight percent solids composed of: (1) an aqueous latex of an interpolymer composed of 2.2 percent by weight of acrylic acid, 4.4 percent by weight of fumaric acid, 19.3 percent by weight of butadiene and 74.1 percent by weight styrene interpolymerized therein; (2) about 20 percent by weight of hexamethylene tetramine based on the solids content of said aqueous latex; and (3) from about 50 to about 100 percent by weight of soybean flour, the amount of soybean flour being based on the solids content of said aqueous latex.

8. A composite product consisting essentially of a plurality of lignocellulosic elements bonded together with a cured adhesive composed of: (1) an interpolymer composed essentially of an aliphatic conjugated diene, containing from 4 to 9 carbon atoms, a monoalkenyl aromatic monomer of the benzene series and at least 2 percent of its compositional weight of at least one monoethylenically unsaturated carboxylic acid interpolymerized therein and (2) at least one formaldehyde-yielding, post-additive compound.

9. The composite product of claim 8, wherein said lignocellulosic elements are particles of wood.

10. The composite product of claim 9, wherein said interpolymer is composed essentially of 2.2 weight percent of acrylic acid, 4.4 weight percent of fumaric acid, 19.3 weight percent of butadiene and 74.1 weight percent of styrene interpolymerized therein.

11. The composite product of claim 9, wherein said formaldehyde-yielding, post-additive compound is hexamethylene tetramine present in an amount of about 5 weight percent based on the solids content of said interpolymer.

12. A composite product consisting essentially of a plurality of lignocellulosic elements bonded together with a cured adhesive composed of: (1) an interpolymer composed essentially of an aliphatic conjugated diene, containing from 4 to 9 carbon atoms, a monoalkenyl aromatic monomer of the benzene series and at least 2 percent of its compositional weight of at least one monoethylenically unsaturated carboxylic acid interpolymerized therein; (2) at least one formaldehyde-yielding, post-additive compound; and (3) a finely divided, water-dispersible filler material.

13. The composite product of claim 12, wherein said lignocellulosic elements are sheets of veneer.

14. The composite product of claim 13, wherein said adhesive is composed of from about 20 to about 60 weight percent solids composed of an interpolymer composed essentially of 2.2 weight percent of acrylic acid, 4.4 weight percent of fumaric acid, 19.3 weight percent of butadiene and 74.1 weight percent of styrene containing about 20 weight percent of hexamethylene tetramine based on the weight of said interpolymer and also containing from about 50 to about 100 weight percent of soybean flour based on the weight of said interpolymer.

References Cited by the Examiner

UNITED STATES PATENTS

| | | | |
|---|---|---|---|
| 2,385,374 | 9/1945 | Rhodes | 260—7 |
| 2,698,318 | 12/1954 | Brown | 260—80.7 |
| 2,754,240 | 7/1956 | Kinney | 260—8 |
| 2,862,896 | 12/1958 | Dede et al. | 260—8 |

WILLIAM H. SHORT, *Primary Examiner.*

MILTON STERMAN, *Examiner.*